United States Patent [19]

Okuno et al.

[11] 3,809,804

[45] May 7, 1974

[54] AUTOMATIC SWITCHING DEVICE FOR EVR PLAYERS

[75] Inventors: Norboru Okuno, Sennan; Toshiro Kamogawa, Hirakata; Yoshihiro Okino, Kyoto, all of Japan

[73] Assignee: Matsushita Electric Industrial Co., Ltd, Osaka, Japan

[22] Filed: Sept. 22, 1972

[21] Appl. No.: 291,272

[30] Foreign Application Priority Data

Sept. 23, 1971 Japan .............................. 46-87022

[52] U.S. Cl. ..................... 178/5.2 D, 179/100.2 AS

[51] Int. Cl. ............................................ H04n 5/36

[58] Field of Search ........ 178/5.4 R, 5.4 CD, 6.6 R, 178/6.6 A, DIG. 28, 5.2 D; 179/100.2 S

[56] References Cited

UNITED STATES PATENTS

| | | | |
|---|---|---|---|
| 3,702,374 | 11/1972 | Numakura | 178/5.4 CD |
| 3,715,474 | 2/1973 | Calfee et al. | 178/5.4 CD |
| 3,752,935 | 8/1973 | Iwawaki | 179/100.2 S |

*Primary Examiner*—Robert L. Richardson
*Attorney, Agent, or Firm*—Stevens, Davis, Miller & Mosher

[57] ABSTRACT

An automatic switching device for automatically switching demodulation modes of an EVR player, for instance a demodulation mode for color reproduction and a demodulation mode for monochromatic reproduction, accordingly as the recorded information of an EVR tape is disclosed.

9 Claims, 11 Drawing Figures

AUTOMATIC SWITCHING DEVICE FOR EVR PLAYERS

This invention relates to automatic switching devices for switching the demodulation mode for the production of monochromatic signal and production of color signal in EVR players.

In the electronic video recording system (hereinafter referred to as EVR), a video signal places modulation on an electron beam being scanned, and the modulated signal is recorded in a high resolution monochromatic film, thereby producing an EVR master tape. The record information of the master tape is printed at high speed on a print tape to obtain an EVR cartridge.

The present invention will become more apparent from the following detailed description of the preferred embodiments of the present invention when taken in conjunction with the accompany drawings in which.

Figure 3:
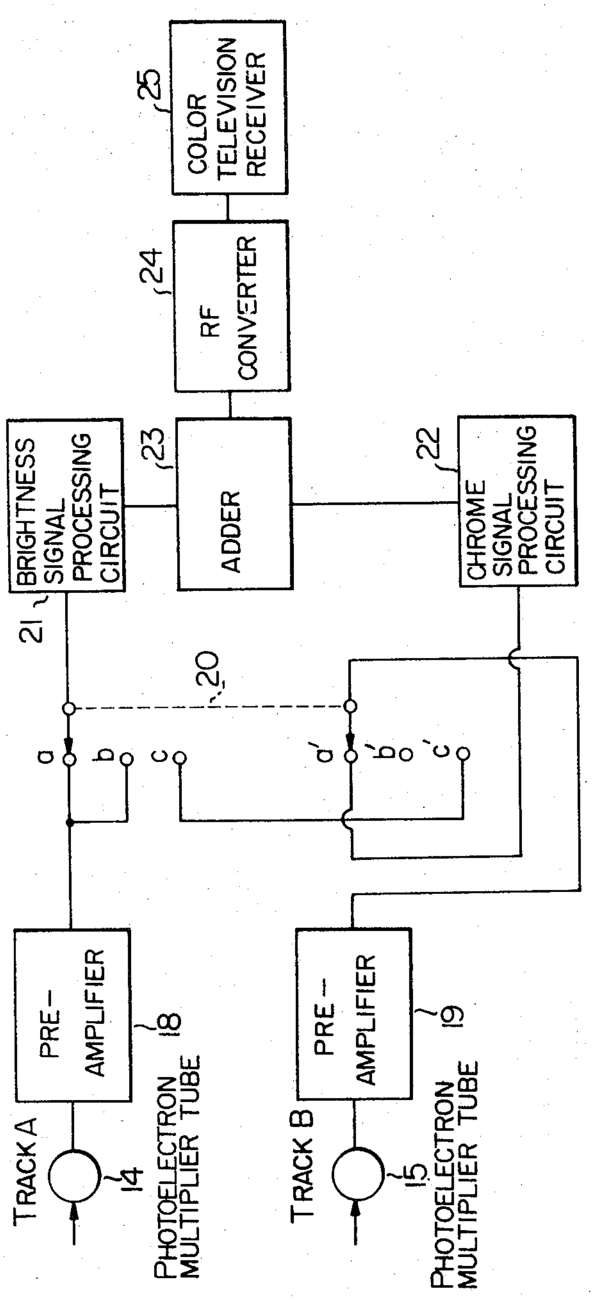
FIG. 3 PRIOR ART
FIG. 3 is a block form representation of a prior-art signal processing system.
Figure 4A:
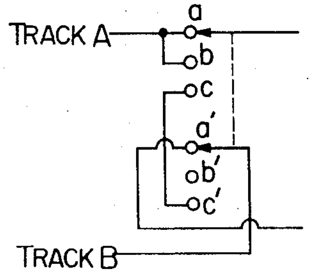
FIG. 4a PRIOR ART
Figure 4B:
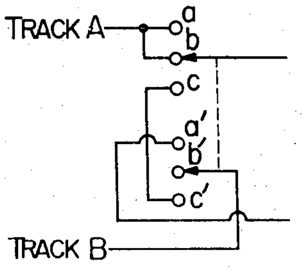
FIG. 4b PRIOR ART
Figure 4C:
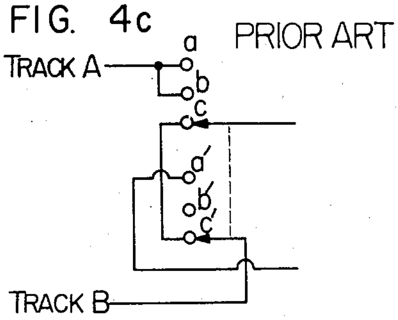
FIG. 4c PRIOR ART

FIGS. 4*a*, 4*b* and 4*c* show a selector mechanism in the system of FIG. 3, in the color signal selection state in FIG. 4*a*, in the track A selection state in FIG. 4*b* and in the track B selection state in FIG. 4*c*.

Figure 5:
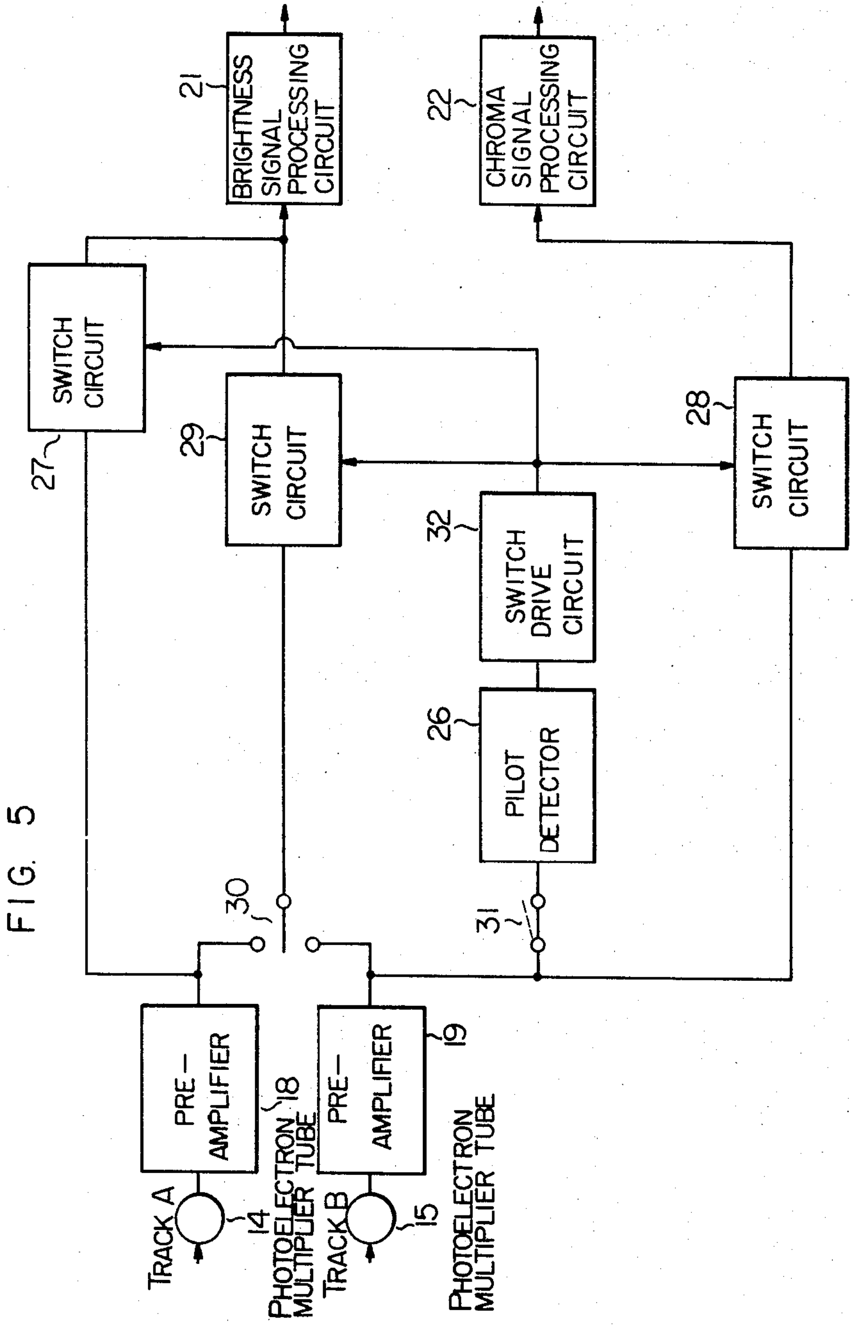

FIG. 5 is a block diagram showing one embodiment of the EVR player automatic switching system according to the invention.

Figure 6A:
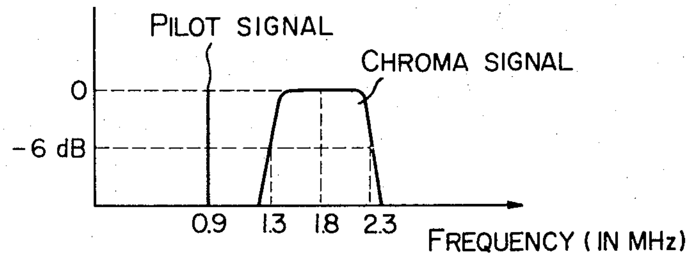
Figure 6B:
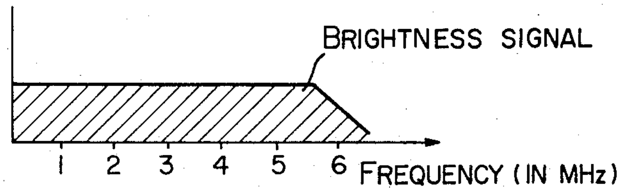

FIGS. 6*a* and 6*b* show frequency spectra of EVR reproduction signals.

Figure 7:
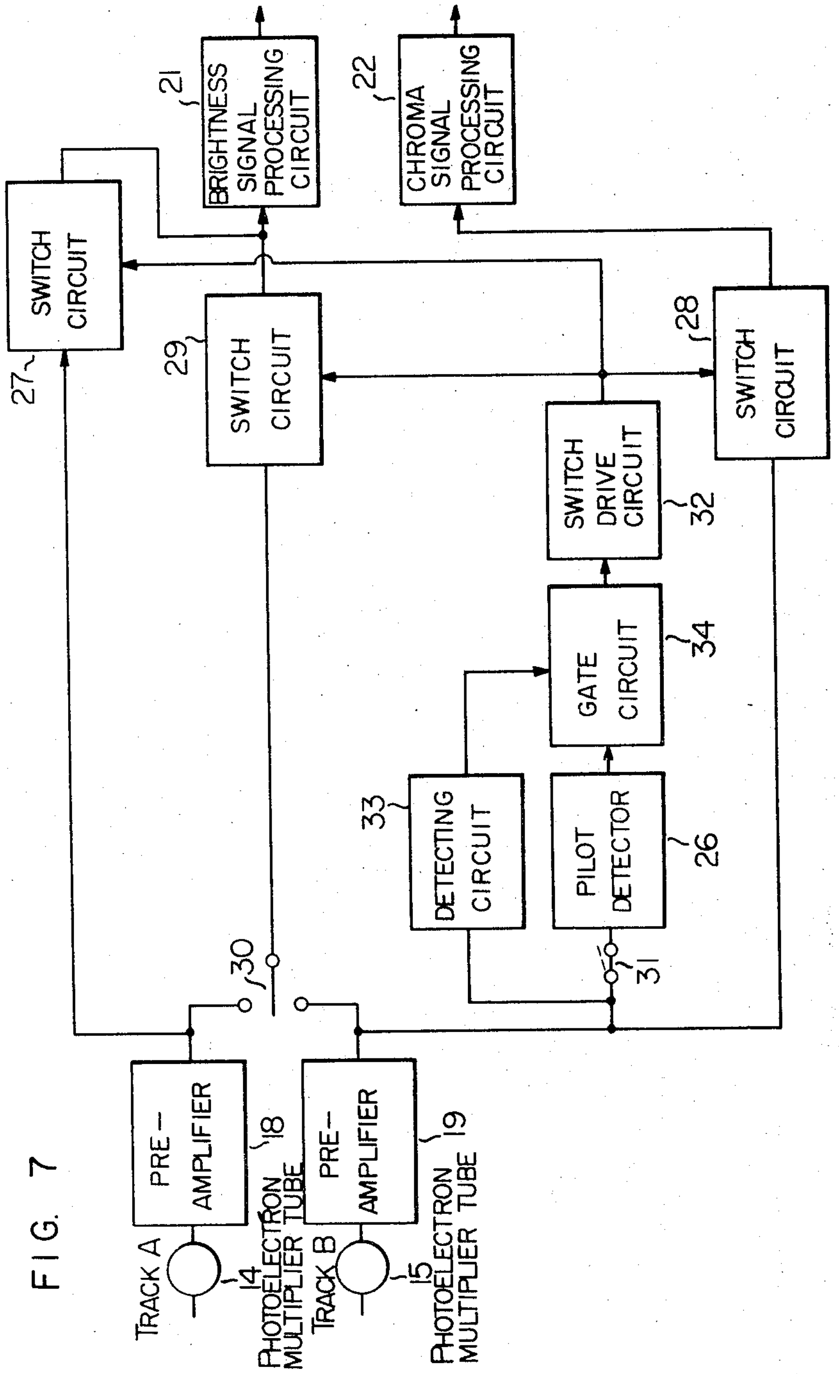
Figure 8:
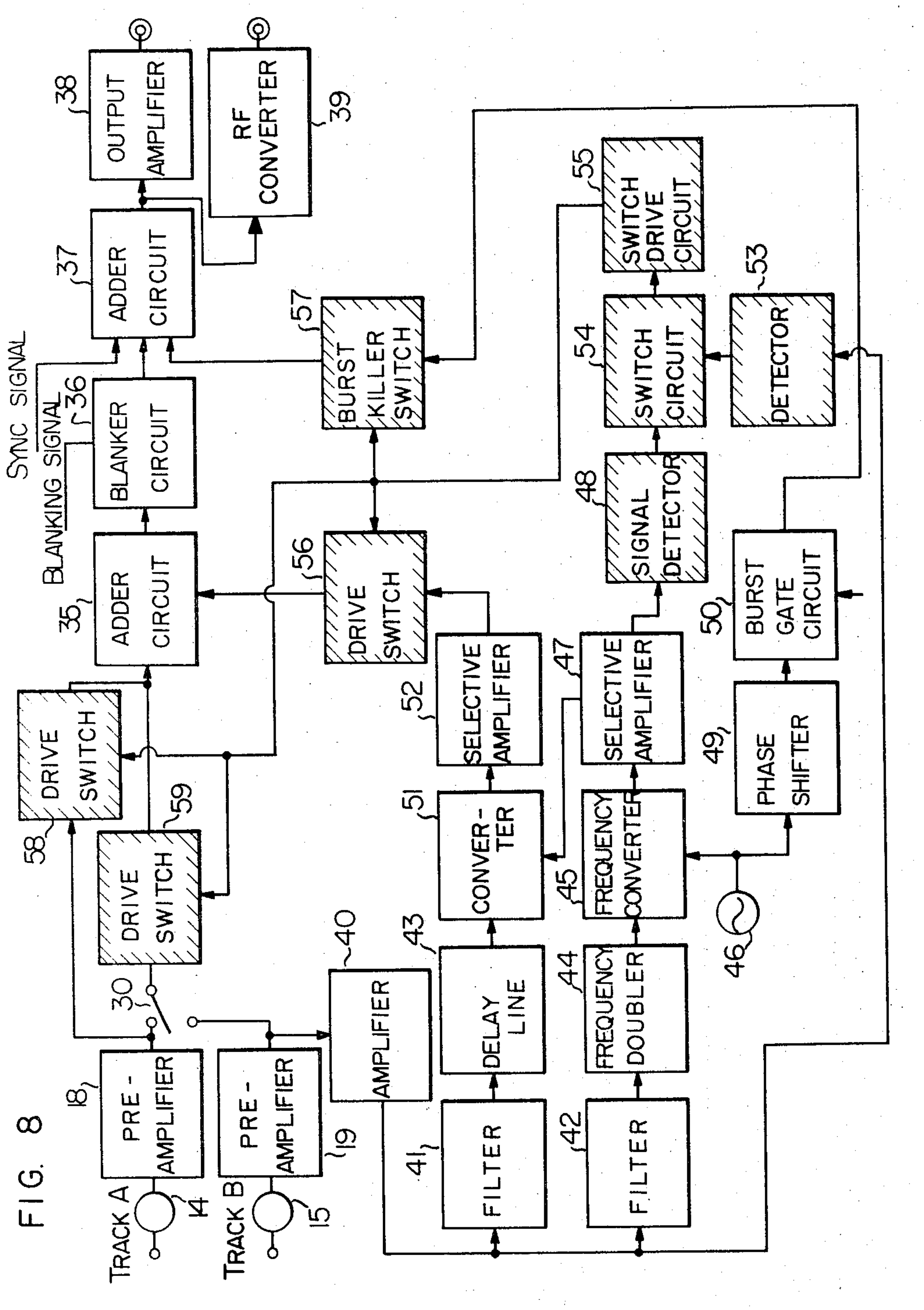

FIGS. 7 and 8 are block diagrams showing other embodiments of the automatic switching system according to the invention.

Figure 1:
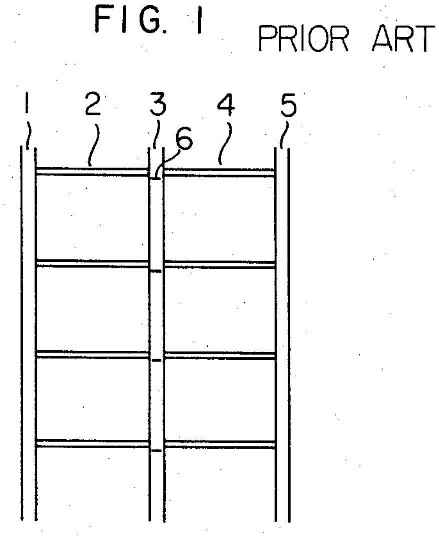
FIG. 1 PRIOR ART
FIG. 1 is a pictorial view of an EVR film.

FIG. 1 outlines such an EVR tape. It has two sound magnetic tracks 1 and 5, which are provided for respective video tracks 2 and 4 (hereinafter referred to as tracks A and B). In case of a monochromatic picture, picture information of different programs can be recorded in the video tracks 2 and 4, while in case of color picture these tracks 2 and 4 respectively serve as a brightness frame track and a color frame track. The tape also has a central track 3, which is a sync. track common to both the left hand and right hand tracks. The central track 3 is provided with sync. windows 6 one for each frame. By playing this cartridge in an EVR player, whose output terminal is connected to an antenna terminal of a television receiver, pictures reproduced by the EVR can be displayed on the television receiver screen.

Figure 2:
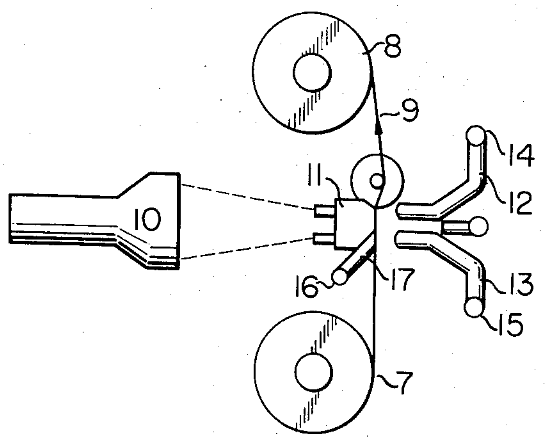
FIG. 2 PRIOR ART
FIG. 2 is a schematic representation of an optical reproducing section of an EVR player.

FIG. 2 outlines an arrangement for reproducing the picture information recorded by the EVR. Referring to the Figure, numeral 9 designates a film, which is driven at a constant speed from cartridge 7 to takeup reel 8, and which is scanned from a flying spot unit 10 through a lens system 11. Light transmitted through the film and modulated according to the shade thereof goes through optical pipes 12 and 13 to photoelectron multiplier tubes 14 and 15 for photoelectric conversion into a brightness signal and a color signal. Meanwhile, light from a small incandescent lamp 16 is guided through an optical pipe 17 to illuminate the sync. windows provided in the sync. track. Every time a sync. window passes by the tip of the optical pipe 17, light transmitted through the window is incident as a light pulse on a photoelectric converting element such as a photodiode and is detected thereby as a sync. pulse. This sync. signal corresponds to the vertical synchronization of the cathode-ray tube raster on the EVR player side and is used for vertical synchronization in the television receiver.

The video signals produced from the photoelectron multiplier tubes are coupled through a suitable signal processing circuitry for conversion into a corresponding NTSC signal to be displayed on the television screen.

FIG. 3 shows a prior-art signal processing system. The video signals of tracks A and B produced by respective photoelectron multiplier tubes 14 and 15 are amplified by respective pre-amplifiers 18 and 19, whose outputs are led to a track selector 20.

FIG. 4 shows the track selector in detail. It can be switched into one of three selective states. For color reproduction with a color cartridge, the track selector is switched into the state shown in FIG. 4*a*. In this state, the track A signal is led through a contact *a* to a brightness signal processing circuit 21, while the track B signal is led through a contact *a'* to a chroma signal processing circuit 22. The outputs of the processing circuits 21 and 22 are added together at an adder 23 for conversion into an NTSC signal, which is passed through an RF converter 24, so that the recorded color picture is reproduced on the picture tube of the color television receiver 25. For the reproduction of monochromatic video of the track A, the track selector 30 is switched into the state of FIG. 4*b*. In this state, the video signal of the track A is passed through a contact *b*, and is coupled through the circuits 21, 23 and 24 for display on the picture tubes 25. On the other hand, the video signal of the track B is coupled on a contact *b'* of the track selector, so it is cut off. Thus, only the track A signal is reproduced on the television screen. For the reproduction of track B monochromatic signal or stripes patterns of color signal containing pilot signal and chroma signal, the track selector is switched into the state of FIG. 4*c*. In this state, the tractor selector is connected to contacts *c* and *c'*, so that the track A signal is cut off by it. On the other hand, the track B signal is led through the contacts *c* and *c'* and is coupled through the brightness signal processing system for display on the picture tube of the television receiver.

In the above prior-art system, when reproducing information of an EVR cartridge it is necessary to select one of the three selective switch states, namely a state for reproducing color information, a state for reproducing track A information and a state for reproducing track B information, depending upon whether the cartridge carries monochromatic information or color information. This is very inconvenient for users not familier with the above system. For example, when the switch is in its state for reproducing the track A signal, a monochromatic picture would be reproduced on the screen even if a color cartridge is being played. will detect no pilot signal even if a color cartridge is played, The invention has been intended to avoid the above inconvenience that the switch should be switched in conformity to the mode of demodulation lest a monochromatic picture should be reproduced even with color information.

The invention features means which can automatically permit reproducing color picture if the cartridge being played carries color information irrespective of the state of the track selector.

In order for the information to be fully understood, it will now be described in conjunction with some preferred embodiments with reference to the accompanying drawing.

FIG. 5 is a block diagram showing one embodiment of the invention. Numeral 26 designates a pilot detector. In the EVR, quadrature modulation of color signals I and Q on 1.8-MHz color sub-carrier wave and a 0.9-MHz pilot signal are superimposed, as shown in the frequency chart in FIG. 6, and encoded for recording on the color signal track. The pilot detector 26 thus detects the 0.9-MHz pilot signal or 1.8-MHz color subcarrier as the pilot signal. Numerals 27 and 28 designate switch circuits, which are rendered "on" when the pilot signal is detected by the pilot detector 26 and are "off" without any pilot signal detected. Numeral 29 designates a switch circuit, which is rendered "off" when the pilot signal is detected by the pilot detector 26 and are "on" without any pilot signal detected. If the EVR cartridge being played is a color cartridge, the pilot signal is detected by the pilot detector 26, so that the switch circuits 27 and 28 are rendered "on" while the switch circuit 29 is rendered "off." Thus, a signal coupled to a track selector 30 is cut off by the switch circuit 29 irrespective of whether the movable contact of the track selector 30 is in contact with the track A side or in contact with the track B side. Meanwhile, the video signal (brightness signal) of the track A is coupled through the switch circuit 27 to a brightness signal processing circuit 21, and the signal (color signal) of the track B is coupled through the switch circuit 28 to a chroma signal processing circuit 22. In this way, reproduction of color picture can be automatically obtained if the cartridge being played is a color cartridge irrespective of the state of the track selector 30.

If the EVR cartridge being played is a monochromatic cartridge, the pilot detector 26 will not detect any pilot signal, so that the switch circuits 27 and 28 are "off" while the switch circuit 29 is "on." Thus, when the track selector 30 is connected to the track A side, the track A signal is coupled through the switch 29 to the processing circuit 21. With the track selector 30 connected to the track B side, the track B signal is this time coupled through the switch 29 to the processing circuit 21. In this way, monochromatic signals of the tracks A and B can be selectively passed by the track selector.

Further, for test or repair service purposes a coded stripes pattern of the color signal track of a color cartridge may be displayed on the television screen. This can be simply achieved by providing a manual switch 31. With the switch 31 held in the "off" state, the pilot detector 26 is played, so that the switch circuits 27 and 28 are "off" while the switch circuit 29 is "on." Thus, it is only necessary to connect the track selector 30 to the track B side for the display of a coded stripes pattern.

Numeral 32 designates a switch drive circuit for driving the switch circuit in response to the output of the pilot detector 26.

While in the preceding embodiment the pilot signal is detected, the same end may be achieved by detecting the color sub-carrier as well.

In the preceding embodiment, when a monochromatic cartridge is being played and the track A is selected, the brightness signal of the track B is also reproduced. If the track B signal contains a large-amplitude component at or around 0.9 MHz, the pilot detector 26 and switch drive circuit 32 are likely to act as if the 0.9-MHz pilot signal was detected. In other words, the so-called mulfunctioning of the pilot detector and switch drive circuit is likely to result in rendering the switch circuits 27 and 28 "on" and the switch circuit 29 "off." In such a case, the brightness signal of the track B is introduced through the switch circuit 28 into the chroma signal processing circuit 22, and it appears as noise on the screen in superimposition upon the brightness signal of the track A.

FIG. 7 shows another embodiment, which can solve the above problem in the preceding embodiment. This embodiment is different from the preceding embodiment of FIG. 5 in that it is provided with additional circuits 33 and 34. The circuit 33 detects any signal outside the frequency band between 0.9 MHz and 2.3 MHz as shown in the frequency chart in FIG. 6. For example, it may use a bandpass filter with a pass band of ±0.2 MHz centered at a frequency of 0.3 MHz for detecting signals at frequencies between 0.1 MHz and 0.5 MHz. The circuit 34 serves as a gate to block the signal from the pilot detector 26 if the circuit 33 detects a signal above a certain level and otherwise permit the signal from the pilot detector 26.

In the operation of the above circuit, when the EVR cartridge being played is a color cartridge, since the signal from the track B meets the frequency requirements shown in the frequency chart of FIG. 6*a*, no signal is present outside the frequency band between 0.9 MHz and 2.3 MHz, so that no signal is detected by the detecting circuit 33. Thus, the circuit 34 is "on" to permit the pilot signal output of the pilot detector 26 to the switch drive circuit 32, thus driving the switch circuits 27, 28 and 29 into the state for the color reproduction.

When the EVR cartridge being played is a monochromatic one, the signal from the track B is as shown in the frequency chart of FIG. 6*b*. If this brightness signal contains a large amplitude component at or round the frequency of 0.9 MHz, the pilot detector 26 would act as if it detected the 0.9-MHz pilot signal in the case of the color reproduction. However, in almost all cases when the brightness signal contains a component at or round 0.9 MHz, it will also contain some other frequency components in a frequency range between 0.1 MHz and 0.5 MHz. In other words, when playing a monochromatic cartridge, if a large amplitude component at or round 0.9 MHz is detected by the pilot detector 26, the circuit 33 will also detect a signal, so that the gate circuit 34 will block the output of the pilot detector 26 off the switch drive circuit 32. This is equivalent in effect to where the pilot signal detected no signal. Thus, the malfunctioning can be prevented.

While the preceding embodiment has used a bandpass filter permitting frequencies between 0.1 MHz and 0.5 MHz for the circuit for detecting signals outside the color channel frequency band, it will be apparent that any type of filter may be used as the bandpass filter as long as a signal at a frequency outside a band between 0.9 MHz and 2.3 MHz can be extracted. Also, since the frequency spectrum of the brightness signal is considered to be continuous, it is possible to use a narrow-band filter.

While the processing of color signal has not been described in detail in connection with the previous embodiments, in practice a circuit for processing the reproduced color signal is provided to obtain 3.58-MHz NTSC chroma signal for the EVR reproduction signal. Thus, in place of using the extracted 0.9-MHz pilot signal for automatically switching the switch circuits as in the previous embodiments, it is possible to use a signal based on a pilot signal dealt in the chroma signal processing circuit. By so doing, the same end of the automatic switching may be achieved with a simplified circuit construction.

FIG. 8 shows a further embodiment, in which the above aspect is taken into consideration. In the Figure, corresponding parts to those shown in FIGS. 5 and 7 are designated by like reference numerals. Here, the shaded blocks constitute the automatic switching device provided with chroma killer and burst killer. The signals of the tracks A and B read out of an EVR player flying spot tube (not shown) are coupled to respective photoelectron multiplier tubes 14 and 15 for photoelectric conversion. The outputs of the tubes 14 and 15 are amplified by respective pre-amplifiers 18 and 19, whose outputs are led to switch selector 30. Concurrently, the track A signal is coupled through drive switch 58 and brightness signal processing system of circuits 35 to 39, and the track B signal is directly coupled to the chroma signal processing system of circuits 40 to 57, where numeral 36 designates a blanker circuit, and 38 and 38 are output amplifiers. The signal of the track A or track B selected by the switch selector 30 is coupled through drive switch 59 and the brightness signal processing system for reproduction.

The track B signal (color signal) directly coupled through the chroma signal processing system consisting of the circuits 40 to 57 is first amplified by amplifier 40, whose output is coupled to filters 41 and 42 to separate the pilot signal of the color signal and chroma signal are shown in the frequency chart of FIG. 6*a*. The pilot signal at 0.9 MHz extracted through the filter 42 is frequency doubled by frequency doubler 44, whose output is coupled for frequency conversion to frequency converter 45, which also receives a signal from 3.58-MHz oscillator 46. The frequency converter 45 produces two output signals at respective frequencies of 5.38 MHz and 1.78 MHz these are respectively the sum and difference frequencies of the input signals from frequency doubler 44 and oscillator 46. Of these two signals, the 5.38-MHz signal is extracted by selective amplifier 47 to be applied to frequency converter 51. Meanwhile, the chroma signal extracted through the filter 41 is passed through delay line 43 for phase correction with respect to the pilot signal, and is then frequency converted in frequency converter 51 with the 5.38-MHz signal from the selective amplifier 47 into signals at 3.58 ± 0.5 MHz and at 7.18 ± 0.5 MHz. Of these signals, the signal at 3.58 ± 0.5 MHz is extracted by selective amplifier 52 for producing an NTSC chroma signal. A sync. signal for the chroma signal and a burst signal are produced by processing the output signal from the 3.58-MHz oscillator 46 through phase shifter 49 and burst gate circuit 50. Numeral 48 designates a 5.38-MHz signal detector to which both the sum and difference signal outputs of amplifier 47 are applied, and numeral 53 designates a detector to detect a signal at a frequency outside the frequency band of the color signal shown in the frequency chart of FIG. 6*b*. Numeral 54 designates a gate, which blocks the signal from the 5.38-MHz detector 48 if the detector 53 detects a signal and permits the afore-mentioned signal if the detector 53 detects no signal. Numeral 55 designates a switch drive circuit to drive switches 56 to 59. The switch 56 serves as chroma killer, and the switch 57 serves as burst killer. The switch 58 is "on" unless the detector 53 detects a signal concurrently with the detection of the 5.38-MHz signal by the 5.38-MHz signal detector 48, and it is otherwise "off". The switch 59 is "off" unless the detector 53 detects a signal concurrently with the detection of the 5.38-MHz signal by the 5.38-MHz signal detectpr 48, and it is otherwise "on."

In the operation of the above circuit, when the or cartridge being played is a color one, the 5.38-MHz signal detector 48 detects the 5.38-MHz signal while the detector 53 does not detect any signal. Thus, the switches 56, 57, 58 and 54 are "on," and the switch 59 is "off." As a result, the brightness signal of the track A is coupled through switch 58 to adder circuit 35, the 3.58-MHz chroma signal is coupled through switch 56 to adder circuit 35, and the burst signal is coupled through the switch 57 to adder circuit 37, whereby the color reproduction can be obtained.

When the EVR cartridge being played is a monochromatic one, the 5.38-MHz signal detector 48 normally detects no 5.38-MHz signal. However, it detects a 5.38-MHz signal if the brightness signal of the track B contains a large amplitude component at or round 0.9 MHz. In such a case, however, the detector 53 also detects a signal, so that the switch 54 is turned "off." This is equivalent in effect to where no 5.38-MHz signal is detected. Thus, the switches 56, 57 and 58 are "off," and the switch 59 is "on." As a result, the color signal is completely cut off, and the track A signal or track B signal selected by the switch selector 30 is coupled to the adder for the reproduction of a monochromatic picture.

In this embodiment, the pilot signal detector and switch circuit can be dispensed with, so that the circuit construction can be further simplified.

The switch 56 serving as chroma killer may be connected between the frequency converter 51 and filter 47 and burst killer switch 57. In such case, however, if the frequency converter 47 gets out of balance, despite the operation of the chroma killer the leakage signal from the frequency converter 47 would be superimposed as noise upon the monochromatic signal in the mixture 35. For this reason, the connection according to the instant embodiment is preferred.

What is claimed is:

1. In a signal demodulating circuit for an EVR player having first and second processing circuits and a tape having first and second tracks, the improvement consisting of an automatic switching device comprising, a. first and second terminals for receiving signals from the first and second tracks respectively of said tape, b. first switching means coupling said first and second terminals to said first and second processing circuits respectively, c. second switching means selectively coupling said first or second terminal to said first processing circuit, and d. first detector means for detecting the presence of a pilot signal in the signal impressed on said second track coupled between said second terminal and said first and second switching means, said first switching means being rendered "on" to connect said first and second terminals to said first and second processing circuits respectively when a pilot signal is detected and "off" when no pilot signal is detected, and said second switching means being rendered "on" to connect said first or second terminal to said first processing circuit when no pilot signal is detected and "off" when a pilot signal is detected.

2. The automatic switching device defined by claim 1 wherein the signals on said first and second tracks include brightness and color signals respectively, said first and second processing circuits are brightness signal and chroma signal processing circuits respectively, said first switching means comprises a first switch circuit coupling said first terminal to said brightness signal processing circuit and a third switch circuit coupling said second terminal to said chroma signal processing circuit, and said second switching means comprises a second switch means and a track selector switch for coupling either said first or second terminal to said second switch means.

3. The automatic switching device defined by claim 2 which further comprises second detector means for detecting the presence of signals outside the frequency band of said color signal, said second detector means coupling said second terminal to said first detector means, said second detector means preventing said first detector means from rendering said first and third switch circuits "on" and said second switch circuit "off" when said second detector means detects the presence of signals outside the frequency band of said color signal.

4. In a signal demodulating circuit for an EVR player including a tape having first and second tracks, said first track being capable of recording a first monochromatic picture or the brightness frame track of a color picture and said second track being capable of recording a second monochromatic picture or the color frame track of said color picture, wherein said color frame track includes pilot and chroma signals, the improvements consisting of an automatic switching device comprising, a. first and second terminals for receiving signals from the first and second tracks respectively of said tape, b. a brightness signal processing circuit including an adder having first and second inputs, c. a first switch circuit for coupling said first terminal to the first input of said adder, d. a second switch circuit for coupling said first o second terminal to the first input of said adder, e. filter means for separating said pilot and chroma signals coupled to said second terminal, f. first and second frequency conversion means coupled to said filter means for converting the frequencies of said pilot and chroma signal respectively to predetermined values, g. a third switch circuit for coupling said second frequency conversion means to the second input of said adder, and h. first detector means for detecting the presence of said pilot signal coupled between said first frequency conversion means and said first, second and third switch circuits, said first and third switch circuits being rendered "on" when a pilot signal is detected and "off" when no pilot signal is detected, and said second switch circuit being rendered "on" when no pilot signal is detected and "off" when a pilot signal is detected.

5. The automatic switching device defined by claim 4 which further comprises a gate circuit interposed between said first detector means and said first, second and third switch circuits, and a second detector means for detecting the presence of signals outside the frequency band of said chroma and pilot signals coupled between said second terminal and said gate circuit, said second detector means closing said gate circuit to prevent said first detector means from rendering said first and third switch circuit "on" and said switch circuit "off" when said second detection means detects the presence of signals outside the frequency band of said chroma and pilot signals.

6. The automatic switching device defined by claim 4, further comprising means for frequency-doubling the separated pilot signal to be applied to said first detector means.

7. The automatic switch device defined by claim 6 which further comprises a gate circuit interposed between said first detector means and said first, second and third switch circuits, and a second detector means for detecting the presence of signals outside the frequency band of said chroma and pilot signals coupled between said second terminal and said gate circuit, said second detector means closing said gate circuit to prevent said first detector from rendering said first and third switch circuit "on" and said switch circuit "off" when said second detection means detects the presence of signals outside the frequency band of said chroma and pilot signals.

8. The automatic switching device defined by claim 4 wherein said first frequency conversion means produces a signal having a sum or difference frequency of the frequencies of said pilot and chroma signal, which signal is applied to said first detector means.

9. The automatic switching device defined by claim 8 which further comprises a gate circuit interposed between said first detector means and said first, second and third switch circuits, and a second detector means for detecting the presence of signals outside the frequency band of said chroma and pilot signals coupled between said second terminal and said gate circuit, said second detector means closing said gate circuit to prevent said first detector means from rendering said first and third switch circuit "on" and said switch circuit "off" when said second detection means detects the presence of signals outside the frequency band of said chroma and pilot signals.

* * * * *